(12) United States Patent
Rogers et al.

(10) Patent No.: US 11,883,957 B2
(45) Date of Patent: Jan. 30, 2024

(54) AUTONOMOUS ROBOT VEHICLE FOR CHECKING AND COUNTING STOCK IN A WAREHOUSE

(71) Applicant: Deutsche Post AG, Bonn (DE)

(72) Inventors: Kent Rogers, Kellyville (AU); Karl Brooks, Wattle Grove (AU)

(73) Assignee: Deutsche Post AG, Bonn (DE)

( * ) Notice: Subject to any disclaimer, the term of this patent is extended or adjusted under 35 U.S.C. 154(b) by 652 days.

(21) Appl. No.: 17/055,221

(22) PCT Filed: May 14, 2019

(86) PCT No.: PCT/EP2019/062306
§ 371 (c)(1),
(2) Date: Nov. 13, 2020

(87) PCT Pub. No.: WO2019/219659
PCT Pub. Date: Nov. 21, 2019

(65) Prior Publication Data
US 2021/0221612 A1    Jul. 22, 2021

(30) Foreign Application Priority Data
May 14, 2018  (AU) ................................ 2018203338

(51) Int. Cl.
*B25J 9/00* (2006.01)
*B25J 9/16* (2006.01)
(Continued)

(52) U.S. Cl.
CPC ............. *B25J 9/0009* (2013.01); *B25J 9/162* (2013.01); *B25J 19/021* (2013.01);
(Continued)

(58) Field of Classification Search
CPC .. B65G 1/1373; B65G 1/0485; B65G 1/1371; B25J 9/0009; B25J 9/162; G05D 1/024;
(Continued)

(56) References Cited

U.S. PATENT DOCUMENTS 10,678,254 B1 *  6/2020  Jonas ..................... A47L 9/0411
10,809,078 B2 * 10/2020  Tajeddin ................ G05D 1/024
(Continued)

FOREIGN PATENT DOCUMENTS

| CN | 203020893 U | 6/2013 |
| CN | 204926339 U | 12/2015 |

(Continued)

OTHER PUBLICATIONS

Chinese Office Action (w/ English translation) for corresponding Application No. 2019800060997, dated Jun. 30, 2023, 17 pages.
(Continued)

*Primary Examiner* — Thomas Randazzo
(74) *Attorney, Agent, or Firm* — Dority & Manning, PA

(57) ABSTRACT

The invention relates to a vehicle chassis (6) for checking and/or counting stock (4) in a warehouse (3) and configured for attaching to an autonomous indoor vehicle (9), with an extendable mast (11) comprising a first end (12) mounted onto the chassis (6) and an opposite second end (13) arrangeable at different distances above the chassis (6), and at least one scanner (2) arranged at the second end (13) and configured for checking and/or counting stock (4) in a shelve (5) of the warehouse (3) lateral to the vehicle (1). The invention further relates to an autonomous robot vehicle (1) comprising the vehicle chassis (6) and the autonomous indoor vehicle (9), whereby the chassis (6) is mounted onto the autonomous indoor vehicle (9) such that the autonomous indoor vehicle (9) and the chassis (6) are configured for autonomously moving the vehicle (1) in the warehouse (3).

18 Claims, 3 Drawing Sheets

(51) Int. Cl.
*B25J 19/02* (2006.01)
*B65G 1/04* (2006.01)
*B65G 1/137* (2006.01)
*G06Q 10/087* (2023.01)
*G05D 1/02* (2020.01)

(52) U.S. Cl.
CPC ......... *B65G 1/0485* (2013.01); *B65G 1/0492* (2013.01); *B65G 1/1371* (2013.01); *B65G 1/1373* (2013.01); *G05D 1/024* (2013.01); *G06Q 10/087* (2013.01); *G05D 2201/0216* (2013.01)

(58) Field of Classification Search
CPC ......... G05D 2201/0216; G06Q 10/087; G06Q 50/28
See application file for complete search history.

(56) References Cited

U.S. PATENT DOCUMENTS

| | | |
|---|---|---|
| 2002/0046564 A1 | 4/2002 | Rastegar et al. |
| 2010/0171826 A1* | 7/2010 | Hamilton ............... H04N 7/188 348/135 |
| 2012/0239224 A1* | 9/2012 | McCabe ................. B66F 9/063 701/2 |
| 2013/0231779 A1* | 9/2013 | Purkayastha ........ G05D 1/0088 700/258 |
| 2014/0074290 A1 | 3/2014 | Kawai et al. |
| 2016/0121913 A1* | 5/2016 | Lim ................... G06K 17/0006 701/19 |
| 2017/0193434 A1* | 7/2017 | Shah .................... G05D 1/0274 |
| 2017/0357270 A1 | 12/2017 | Russell |
| 2018/0053275 A1* | 2/2018 | Jones .................. G05D 1/0088 |
| 2018/0108134 A1* | 4/2018 | Venable .................. G06T 7/521 |
| 2018/0180740 A1* | 6/2018 | Shaffer ................... G01S 17/06 |
| 2018/0253690 A1* | 9/2018 | Bryan ................ G06Q 10/0875 |
| 2018/0374036 A1* | 12/2018 | Nazarian ................ G06V 20/10 |
| 2019/0041868 A1* | 2/2019 | Cantrell ................ G06K 7/1413 |
| 2019/0205822 A1* | 7/2019 | Bryan .................. G06Q 10/087 |

FOREIGN PATENT DOCUMENTS

| | | |
|---|---|---|
| CN | 105522583 A | 4/2016 |
| CN | 205295655 U | 6/2016 |
| CN | 205657792 U | 10/2016 |
| CN | 106352215 A | 1/2017 |
| CN | 206451462 U | 8/2017 |
| EP | 2573041 A1 | 3/2013 |
| GB | 2338606 A | 12/1999 |

OTHER PUBLICATIONS

Chinese Search Report (w/ English translation) for corresponding Application No. 2019800060997, dated Jun. 28, 2023, 6 pages.
Office Action and Search Report for corresponding Application No. CN 2019800060997, dated Sep. 29, 2022, 12 pages.
International Search Report PCT/EP2019/062306, dated Aug. 8, 2019 (4 pages).

* cited by examiner

AUTONOMOUS ROBOT VEHICLE FOR CHECKING AND COUNTING STOCK IN A WAREHOUSE

The invention relates to a vehicle chassis for checking and/or counting stock in a warehouse and configured for attaching to an autonomous indoor vehicle. The invention further relates to an autonomous robot vehicle comprising the vehicle chassis and the autonomous indoor vehicle. The invention even further relates to a method for checking and/or counting stock in a warehouse.

BACKGROUND

Stock, such as items, pallets, cartons, raw materials, packing materials, spare parts, components, finished goods associated with agriculture, manufacturing and/or production, is stored by manufacturers, importers, exporters, wholesalers, transport businesses, customs, etc. in warehouses, also referred to as logistics centers, distribution centers, fulfillment centers, cross-dock facilities, bulk break centers or package handling centers. The stock is delivered to the warehouses by trucks, by trains or by ships, often in containers, and then stored in shelves defining corridors in the warehouses. The stock can be directly stored in the shelves or on pallets, which are then stored in the shelves. Said shelves usually comprise various levels and/or departments for storing the stock in different levels above each other such that the shelves reach heights up to 15 meters above ground. The stored stock is then redistributed, for example, to retailers, to wholesalers, or directly to consumers.

Once a stocktake in a warehouse is complete and an inventory is signed off by an auditor, variations between the inventory and the physical warehouse can begin to be introduced. For example, stock pickers may scan level 4 barcode instead of level 5 or override directed putaway locations and put stock in locations physically empty but occupied in the inventory, ignoring an error or simply overriding it. Pallets with stock are pulled down to be viewed and put away to a neighboring location. These and other activity can cause the inventory accuracy to diminish over days, weeks and months.

However, today's logistic operations require a very accurate and permanent assessment of the stock currently stored in a warehouse. Due to before described problems and as said shelves comprises heights up to 15 meters or even more, as the warehouses often cover areas of more than 100.000 square meters and as thousands and millions of pieces stock are stored in such warehouses, an accurate and permanent inventory becomes a challenging, time consuming and thus also costly task. Today's methods and systems for assessing stock inventory in warehouses do not allow such accurate assessment as required.

SUMMARY OF SOME IMPLEMENTATIONS OF THE INVENTION

It is an object of the invention to provide a system and a method for accurately assessing stock stored in a warehouse.

The object is solved by the features of the independent claim. Preferred implementations are described by the features of the dependent claims.

Thus, the object is solved by a vehicle chassis for checking and/or counting stock in a warehouse and configured for attaching to an autonomous indoor vehicle, with an extendable mast comprising a first end mounted onto the chassis and a second, opposite end arrangeable at different distances above the chassis, and with at least one scanner arranged at the second end and configured for checking and/or counting stock in a shelve of the warehouse lateral to the vehicle.

The object is further solved by an autonomous robot vehicle comprising the vehicle chassis and the autonomous indoor vehicle, whereby the chassis is mounted onto and/or integrally formed with the autonomous indoor vehicle such that the autonomous indoor vehicle and the chassis are configured for autonomously moving the vehicle in the warehouse.

It is therefore a key point of the invention that stock stored in shelves of the warehouse can be automatically and autonomously checked and/or counted respectively inventoried. Thereby, the chassis and the autonomous indoor vehicle can be provided as a single piece as autonomous robot vehicle or as separate pieces such that the chassis is releasably attachable to the autonomous indoor vehicle. For both alternatives the proposed solution guarantees a reliable assessment of stock stored in shelves in a warehouse. As the mast is extendable, stock stored in higher levels of the shelve can be assessed respectively inventoried as well as stock stored immediately besides the chassis. Thus, the vehicle chassis and/or the autonomous robot vehicle prevents that stock being misplaced in warehouses is lost or cannot be accessed by providing an easy and reliable solution for counting stock, such as items, pallets or cartons, in warehouses in an autonomous way. For example, the autonomous robot vehicle may automatically move during night-times through all corridors of a warehouse for updating a database with actual stock information, with spare spaces in shelves, misplaced stock, newly determined stock etc. The proposed solution also allows an empty location check every night. In addition, any checks can be scheduled to happen automatically for verifying that locations in the warehouses have correct stock at the inventoried locations. For example, every weekend the proposed solution may perform a full wall to wall check of all reserve locations in the warehouse, without any labor cost.

The vehicle chassis, autonomous indoor vehicle and/or the autonomous robot vehicle preferably comprise wheels for moving in the warehouse, a rechargeable battery and/or means for automatically and/or autonomously navigating and/or moving within the warehouse, for example along a predefined or a self-derived path. The chassis is preferably detachable from the autonomous indoor vehicle such that the autonomous indoor vehicle may automatically move, for example for re-charging the vehicle, without the chassis to a base station and/or a charging point. Another autonomous indoor vehicle may move to the chassis, lock the chassis to the another autonomous indoor vehicle any continue checking and/or counting stock in the warehouse.

According to a preferred implementation, the mast is extendable between the first end and the second end by a distance of ≥1 meters and ≤15 meters, in particular ≥1.8 meters and ≤12 meters. Such way stock stored in upper floor levels of the shelve can be scanned by extending the mast. Floor level location barcodes are usually on a first beam level pointing down. Thus, the scanner is preferably mounted below 1.8 meters at the mast.

In another preferred implementation, the mast is provided as a telescopic arm and/or as a fork lift device. The telescopic arm is preferably actuated by pressurized air provided by a compressor installed in the chassis for easily extending and retracting the mast.

According to another preferred implementation, the vehicle comprises a vibration isolating device arranged at the first end and/or at the second end configured for eliminating movements of the extendable mast. When the mast is enlarged even small vibrations from the surface may cause large movements on the second end of the mast i.e. of the masthead resulting in severe impact of the picture quality when the scanner is checking and/or counting respectively scanning stock. Thus, the vibration isolating device allows for achieving a better checking and/or counting quality. The vibration isolating device can be integrated either in the masthead or in a mounting system of the mast at the first end to eliminate small movements for getting stable pictures of the scanner.

While the vibration isolating device can be providing in different way, it is according to further preferred implementation preferred that the vibration isolating device comprises a motor working counter-wise to detect distracting movement from wheels of the autonomous robot vehicle and/or comprising water-balancing. Such way distracting movements of the mast can be reduced to an acceptable level or eliminated.

In a further preferred implementation, the chassis and/or the vehicle comprises at least two scanners arrangeable at the mast at different distances above the chassis and/or comprising a moving gimbal arranged at the first end between the chassis and the mast and a battery for providing electrical energy to the vehicle, whereby the battery is arranged at the first end at the mast as counterweight such that the mast is balanced in vertical direction relative to ground. By using two preferably different scanners different information can be obtained, for example one scanner may scan a barcode provided on the stock while another scanner may determine a volume of the stored stock and/or check if the shelf is occupied. As the scanners are arranged at different distances scanning results from the scanners may be superimposed for receiving a better scanning quality. The scanner may be configured to read an UHF RFID tag, typically as part of an License Plate Barcode, LPN, label, on a pallet and/or of the stock, to scan the LPN or Serial Shipping Container Code, SSCC, identification number/barcode via an image scanner, for example via a 1D and/or 2D barcode reader, to detect if a reserve location has a pallet and/or stock stored in it, for determining if the location/shelf is occupied or not occupied, for example via a sonar scanner, and/or to take a color photo of the location respectively of the shelf. Due to the battery as counterweight for the mast and the gimbal, the mast swings into respectively remains in a vertical position between its ends if the vehicle moves curves. Thus, the vehicle may move curves at higher speed while checking and/or counting stock while moving curves.

According to another preferred implementation, the chassis and/or the vehicle comprises a second extendable mast arranged rectangular to the extendable mast, a first end of the second mast is mounted to the second end of the extendable mast and the second mast comprises at least one additional scanner configured for checking and/or counting stock underneath the second mast and arrangeable at different distances from the second end of the extendable mast. The second mast is preferably provided as a telescopic arm. Preferably, the second mast can be extended into the shelf such that stock not into sight from the vehicle and/or the corridor can be reliably scanned and determined. Further, as the mast and the second mast are arranged rectangular to each other, scanning results from the scanners may be superimposed for receiving a better scanning quality.

In another preferred implementation, the scanner comprises a LIDAR sensor, a barcode reader, an RF scanner, an RFID scanner, a sonar and/or a camera. The RF scanner is preferably provided as a stripe and/or 2D scanner configured for determining barcodes, such as License Plate Barcodes, LPN, provided on the stock for uniquely identifying the stock. By using the sonar and/or the camera emptiness of a shelve and/or a level of a shelve can be verified. The camera is preferably provided as HD camera for taking pictures of the stock. As the mast is moveable with respect to its second end at which the scanner is attached to, different levels of the shelve can be checked by extending and/or retracting the mast. The LIDAR sensor can be used for checking/counting the stock and for navigating the vehicle. Preferably, the scanner is attached to the mast such that the scanner scans an area lateral to the vehicle. Thus, if the vehicle moves along a corridor of the warehouse confined by shelves on both sides, the scanner is preferably attached to the mast to scan stock stored in the shelves. Thereby, the scanner might be moveable around the mast, for example by 180° or 360°, for scanning stock in opposite shelves. Alternatively, at least two scanners can be provided at the mast which are arranged opposite to each other for scanning stock in opposite shelves of the corridor.

According to a further preferred implementation, the chassis and/or the vehicle comprises a control device configured for determining if the shelf scanned by the scanner comprises stock, for comparing the scanned shelf with a shelf database and/or for remembering a position of a scannable label of an item, in particular a pallet and/or carton, stored in the shelf. The control device preferably comprises a microprocessor and/or is provided computerized and/or the shelf database is provided in the vehicle or on a server, for example of the warehouse. Thus, for communicating with a shelf database provided at the warehouse the vehicle preferably comprises a communication device for wirelessly communicating with the server for example via a wireless network provided in the warehouse. Remembering the position can be done by storing the position in the shelf database. Such way, during a subsequent counting and/or checking drive, the vehicle "knows" where to scan the label and/or the item in the warehouse and/or within the specific shelf.

In a further preferred implementation, the vehicle comprises a battery for providing electrical energy to the vehicle for moving along a predefined and/or self-derived route in the warehouse, the vehicle is configured for autonomously returning to a base station at low battery and/or for continuing the commenced route once the battery has been recharged. Thereby, the vehicle may detach from the chassis or, if integrally formed, move together with the chassis to the base station. The base station is preferably provided with a charging point for automatically charging the vehicle.

According to another preferred implementation, the vehicle comprises a LIDAR debris detection sensor configured for detecting debris in moving direction of the autonomous robot vehicle. The LIDAR debris detection sensor is preferably mounted in front of the vehicle to detect upcoming debris, such as, for example, rubble, wreckage, ruins, litter and discarded garbage/refuse/trash, scattered remains of something destroyed, etc. In case debris is detected, the vehicle may amend its route for bypassing the debris. Such way the vehicle is not unnecessarily stopped by the debris.

In this regard and according to a further preferred implementation the vehicle comprises brushes configured for cleaning wheels of the vehicle. In case debris is detected the brushes may start working and cleaning the wheels of the vehicle such that the vehicle may continue its route even due to debris. Preferably all wheels are equipped with brushes. In a further preferred implementation the LIDAR sensor is configured for detecting and/or estimating a debris level. If the debris level reaches a specific threshold the brushes will start working.

In another preferred implementation the vehicle comprises an airblast device configured for blasting away debris in moving direction of the autonomous robot vehicle. Such airblast device can be provided as a fan and is especially advantageous for blasting away debris of bigger diameters such as, for example, bigger plastic debris.

The object of the invention is further solved by a method for checking and/or counting stock in a warehouse with a vehicle chassis configured for attaching to an autonomous indoor vehicle, whereby an extendable mast is mounted with a first end onto the chassis and a scanner is arranged at a second, opposite end of the mast, the method comprising the steps of autonomously moving the vehicle chassis with the autonomous indoor vehicle in the warehouse, and checking and/or counting stock in a shelf of the warehouse lateral to the vehicle at different distances above the chassis with the scanner. Thereby, the vehicle chassis is preferably attachable respectively detachable and/or integrated with the autonomous indoor vehicle. Preferably, the vehicle chassis and/or the autonomous indoor vehicle follow a self-derived path along corridors in the warehouse by incorporating travel path optimization so that multiple task lists can be combined into a most efficient travel path. Further, multiple autonomous robot vehicles as combination of vehicle chassis and autonomous indoor vehicles may move in different areas of the warehouse at the same time without risk of collision.

In a preferred implementation the method comprises the steps of comparing a checked and/or counted result provided by the scanner with data stored in a shelf database for determining a difference, and if a difference is determined, scanning a label of an item stored in the shelf and/or capturing a photo of the item and updating the shelf database with the scanned label and/or the captured photo, and/or if no difference is determined, scanning a label of the item stored in the shelf and/or capturing a photo of the item and comparing the scanned label and/or the captured photo with data stored in the shelf database. Such way it can be confirmed that a location in the shelf is in fact empty or occupied. In case the location is empty, the database is updated with actual information about the stock stored in the location. If the location is, for example, marked occupied in the database, a verification can be conducted for making sure that stock listed in the database for said location is actually stored in the location. Such way, the database can be updated with missing information such as the scanned label or the captured photo.

In another preferred implementation the method comprises the steps of determining a volume of the stock in the shelf and based on the determining volume, calculating a number of items, pallets and/or cartons stored in the shelf, and/or determining a type of an item and/or a pallet stored in the shelf by scanning a label of the item and/or of the pallet and comparing the scanned label with a shelf database. Thereby, a type of a pallet and/or carton stored in the shelf can be determined and/or stored in the database. Preferably, the determined volume is stored in the database and/or the volume is determined by the scanner. Generally, the scanner for checking and/or counting stock and/or for determining the volume may use an algorithm for picture analysis and/or picture recognition for extracting said data from the scanned data. The database may comprise information on the stock delivered into and/or out of the warehouse for comparing the scanned data with said stored data. By determining the volume, the number of pallets and/or type of the item and/or of the pallet an overall usage of the shelf and/or of the warehouse can be calculated.

In a further preferred implementation, the method comprises the steps of moving the vehicle for checking and/or counting stock in the shelf with a speed of at least 1, 2, 4 or 6 meters per second, and/or determining an actual location of the vehicle within the warehouse while checking and/or counting stock in the shelf. With such speed even warehouse with greater dimensions can be reliably inventoried and the stock stored therein checked and/or counted. The actual location of the vehicle can be stored in the database together with information related to the scanned stock.

In another preferred implementation, the method comprises the steps of scanning a label of an item stored in the shelf, determining a label position on the item and/or determining a location of the item in the shelf and/or in the warehouse, and storing scanned label information, the label position and/or the location in a shelf database. Thus, by recording an exact location of the item and/or the pallet and at which position the label can be found, future scans are optimized as searching for the location and/or position becomes unnecessary. Any data refresh to the shelf database preferably includes a last activity date so it can be ascertained when the last movement of the vehicle was actioned.

In even another preferred implementation, the method comprises the step of repeating scanning the label, determining the label position and/or determining the location of the item considering the previously scanned label position and/or the location of the item.

In still another preferred implementation, the method comprises a second extendable mast arranged rectangular to the extendable mast, a first end of the second mast mounted to the second end of the extendable mast and the second mast comprising at least one additional scanner and the method comprises the step of checking and/or counting the stock underneath the second mast at different distances from the second end of the extendable mast with the additional scanner.

Further implementations and/or advantages of the method and/or the chassis are apparent for the person skilled in the art from the chassis respectively the vehicle as described before.

Other example implementations of the invention will be described in the following with reference to the figures. It has to be noted that the figures are only provided for illustration of the general concept of the invention by examples not defining the scope of protection of the invention. The figures are not drawn to scale. Features shall not be considered to be essential for the present invention because they are depicted in the figures.

BRIEF DESCRIPTION OF THE FIGURES

In the figures

DETAILED DESCRIPTION OF THE FIGURES

Figure 1:
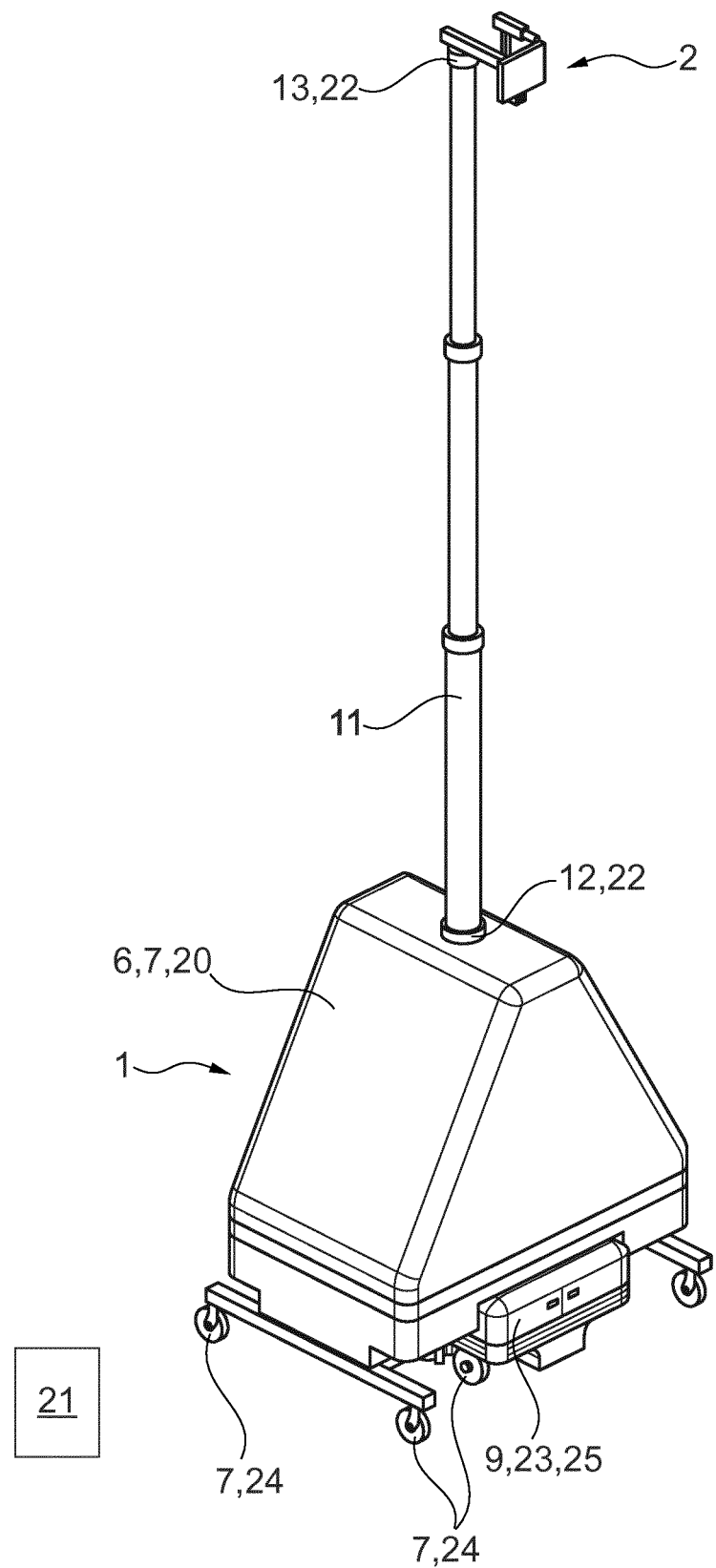
FIG. 1 shows an exemplary implementation of an autonomous robot vehicle according to the invention in a schematic perspective view.

The invention will be described in the following with reference to exemplary implementations showing an autonomous robot vehicle 1 according to a first implementation in a schematic perspective view in FIG. 1, an exemplary implementation of a scanner 2 of the autonomous robot vehicle 1 according to FIG. 1 in a schematic perspective view and a further exemplary implementation of the autonomous robot vehicle 1 according to the invention in a schematic side view.

Figure 3:
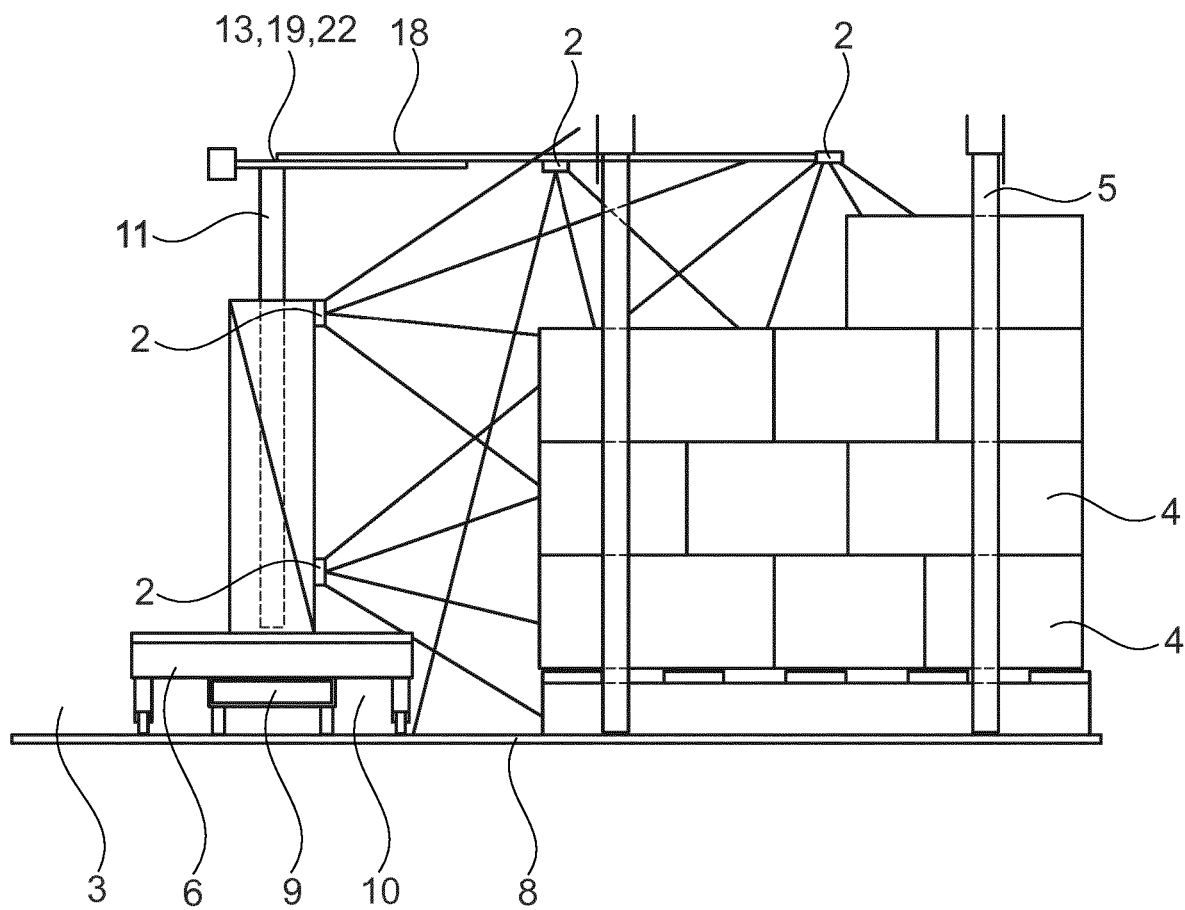
FIG. 3 shows a further exemplary implementation of the autonomous robot vehicle according to the invention in a schematic side view.

The autonomous robot vehicle 1, also referred to as vehicle 1 in the following, is configured for autonomously moving the vehicle 1 in a warehouse 3 for autonomously and automatically for checking and/or counting stock 4 arranged in shelves 5 of the warehouse 3. The autonomous robot vehicle 1 comprises a chassis 6 with wheels 7 attached thereto for moving the vehicle 1 on a floor 8 of the warehouse 3. The chassis 6 can be provided as a single piece or, as shown in FIGS. 1 and 3, as a two-piece chassis 6 comprising an autonomous indoor vehicle 9, on which the chassis 6 is solidly put on as a base for forming the vehicle 1.

Each the chassis 6 and the autonomous indoor vehicle 9 comprise four wheels 7 arranged at corners of the chassis 6 and the autonomous indoor vehicle 9. The autonomous indoor vehicle 9 can be provided as commercially available product from suppliers Omron Lync Adept, Fetch Robotics, Swisslog Carry Pick, MIR etc. for moving the vehicle 1 with a typical travel speed of 1.8 meters per second. The chassis 6 comprises a length of 1100 mm and width of 900 mm. The autonomous indoor vehicle 9 is arranged underneath the base in a tunnel 10 formed by the chassis 6 and may be configured for driving in and out of the tunnel 10 for connecting and disconnecting with the different bases respectively chassis 6.

The chassis 6 is provided as a rigid frame and comprises an enclosure for a battery 20, a compressor and a control device 17 configured for operating the vehicle 1. The battery 20 allows a run time of the vehicle 1 of at least 45 hours. Being controlled by the control device 17, the vehicle 1 moves along a predefined and/or self-derived route in the warehouse 3. If the control device 17 determines a low battery 20 respectively a status of the battery 20 indicating that charging of the battery 20 is required, the control device 17 controls the vehicle 1 to autonomously return to a base station 21 comprising a charger for the battery 20. Once the battery 20 is recharged, the control device 17 controls the vehicle 1 to continue the commenced route.

The vehicle 1 further comprises an extendable mast 11 with a first end 12 mounted onto the chassis 6 and a second, opposite end 13, which is arrangeable at different distances in vertical direction above the chassis 6. The mast 11 is extendable between its first end 12 and the second end 13 by a distance between 1 to 15 meters. Both at the first end 12 and at the second end 13 gimbals 12 are provided such that, when moving the vehicle 1, the mast 11 always maintains a vertical position relative to ground. For the gimbal 12 arranged at the first end 12 at the chassis 6 the battery 20 acts as a counterweight for the mast 11. Therefore, the battery 20 is attached to the first end 12 while being installed respectively "hidden" in the enclosure of the chassis 6. The mast 11 is provided as telescopic arm actuated by pressurized air provided by the compressor installed in the enclosure of the chassis 6.

A vibration isolating device 22 that is configured for eliminating movements of the extendable mast 11 is arranged each at the first end 12 and at the second end 13. The vibration isolating device 22 comprises a motor working counter-wise to detect distracting movement from wheels 7 of the autonomous robot vehicle 1 and/or comprising water-balancing. The autonomous robot vehicle 1 further comprises a LIDAR debris detection sensor 23, which is configured for detecting debris in moving direction of the autonomous robot vehicle 1. If debris is detected, brushes 24 arranged at the wheels are activated for cleaning the wheels 7 of the autonomous robot vehicle 1. Debris of greater diameter can be based away by an airblast device 25 arranged in moving direction at the autonomous robot vehicle 1.

Figure 2:
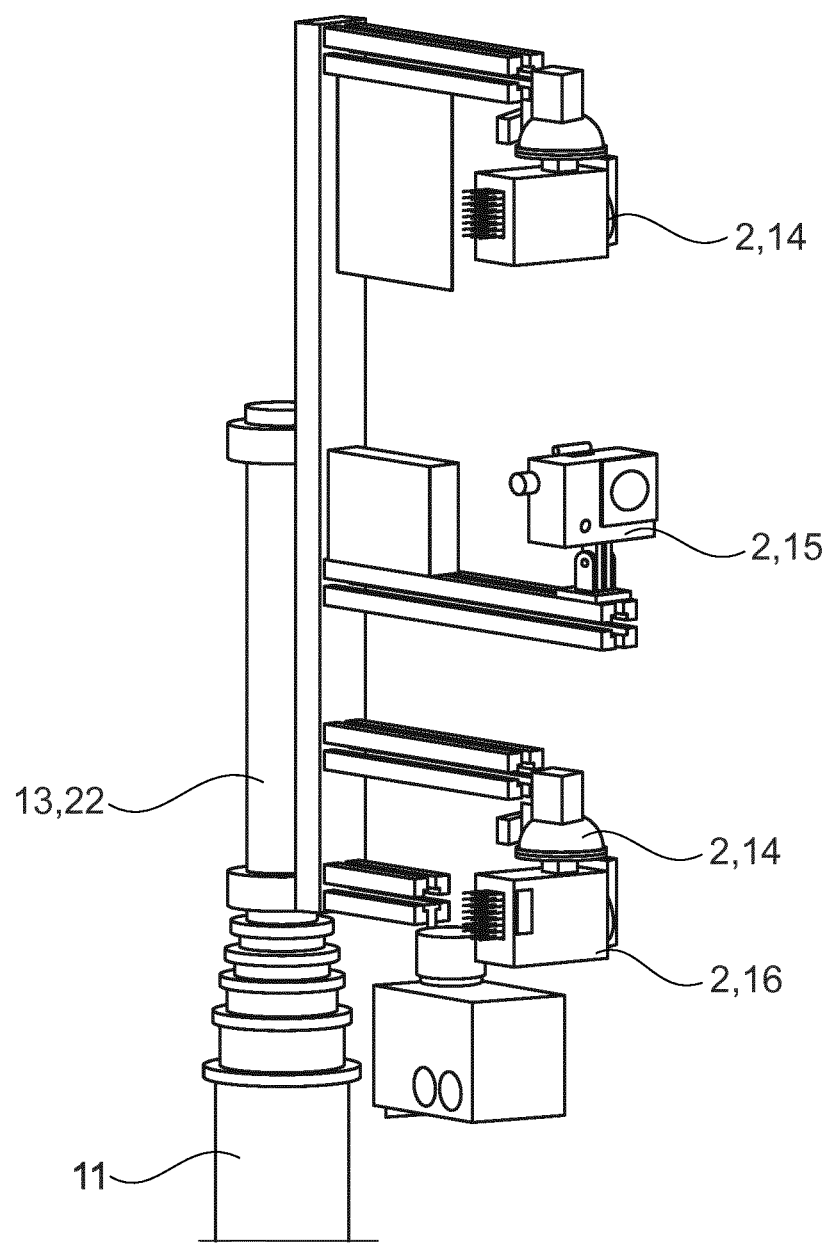
FIG. 2 shows an exemplary implementation of a scanner of the autonomous robot vehicle according to FIG. 1 in a schematic perspective view.

At least one scanner 2 is arranged at the second end 13 of the mast 11 via the second gimbal. As can be seen in more Detail in FIG. 2, the at least one scanner 2 is arranged at the second end 13 such stock 4 stored in the shelve 5 lateral to the vehicle 1 can be scanned and respectively counted by said scanner 2, as can also be seen in FIG. 3. Turning back to FIG. 2, in the shown implementation four scanners 2 are arranged in firm distances to each other at the second end 13. At the top at the second end 13 an image scanner 2, 14 is mounted, which is configured for searching barcodes provided on the stock 4. Beneath thereof a sonar and a camera 15 is mounted as second scanner 2. In the following and distant from the first image scanner 2, 14, a second image scanner 2, 14 is mounted for searching barcodes provided on the stock 4 arranged in the same or a beneath row of the shelf 5. At the bottom, a linear stripe reader 16 for scanning beam location labels is arranged as fourth scanner 2. Said scanners 2 can be provided as a LIDAR sensor, as said barcode reader, as an RF scanner, as an RFID scanner, as a sonar and/or as said camera.

The scanners 2 are connected to the computerized control device 17, which determines, based on scanning data received from the scanners 2 while the vehicle 1 moves along the warehouse 3, if the scanned shelf 5 comprises stock 4. If stock 4 is detected, the scanning data is compared by the control device 17 with a shelf database available to the control device 17. Alternatively, the control device 17 transmits the scanning data to a server, which then compares the scanning data with the shelf database. The scanning data may comprise a scannable label of an item, a pallet and/or carton stored as stock 4 in the shelf 5. The control device 17 and/or the server extract a position of the label of the item, the pallet and/or the carton in the shelf 5 from the scanning data. Location barcodes can be identified, for example, for a font and/or length of its content.

FIG. 3 shows an implementation of the vehicle 1, which comprises at least two scanners 2 arrangeable at the mast 11 at different distances in vertical direction above the chassis 6. Said two scanners 2 are arranged and configured for scanning stock 4 lateral i.e. besides to the vehicle 1. Thus, with LIDAR sensors as scanners 2, pulsed laser lights are emitted by said LIDAR sensors in a direction essentially lateral to the vehicle 1. In addition thereto, the vehicle 1 comprises a second extendable mast 18 provided as telescopic arm. The second extendable mast 18 is arranged rectangular to the extendable mast 11, whereby a first end 19 of the second mast 18 is firmly mounted to the second end 13 of the extendable mast 11. A counterweight provided at the first end 19 of the second mast 18 ensures that the second extendable mast 18 extends in horizontal direction.

Two additional scanners 2 are attached to the second mast 18 such that stock 4 underneath the second mast 18 can be checked and/or counted by the two additional scanners 2. Thereby, as can be seen in FIG. 3, the second mast 18 is extendable from its first end 19 into the shelf 5 such that at least one of the two additional scanners 2 rests within the shelf 5. The two additional scanners 2 are provided as LIDAR sensors and are arranged such that pulsed laser lights are emitted by the two additional LIDAR sensors in a direction essentially underneath from the second mast 18.

In sum, the described vehicle 1 allows for an autonomously moving in the warehouse for checking and/or counting stock 4 in shelves 5 lateral to the vehicle 1 in the warehouse 3 at different distances above the chassis 6 with the scanner 2. Thereby, the vehicle 1 may follow a preconfigured route along corridors of the warehouse 3, which are confined by the shelves 5. As the mast 11 is extendable, different compartments of the shelves 5 arranged above each other can be scanned in parallel or consecutively.

The control device 17 thereby compares a checked and/or counted result respectively scanning data provided by the scanner 2 with data stored in a shelf database for determining a difference. If a difference is determined, a label, for example a barcode, of an item stored in the shelf 5 as stock 4 is scanned and a photo of the item is captured. For scanning barcodes, technologies such as sweeping camera/moving spot may be advantageously used. Such way, the scanner 2 may perform circular movement for more accurately determining barcodes. The shelf database is then updated with the scanned label and the captured photo. In case no difference is determined, the label of the item stored in the shelf 5 and the captured photo of the item is compared with the scanned label and the captured photo with data stored in the shelf database for verifying said information.

The control device 17 is further configured to determine a volume of the stock 4 stored in the shelf 5 by using the scanner 2 and, based on the determining volume, to calculate a number of items, pallets and/or cartons stored in the shelf 5. Furthermore, the control device 17 determines a type of an item stored in the shelf 5 by scanning the label of the item and compares the scanned label with the shelf database. During checking and/or counting stock in the shelf 5, the vehicle 1 moves with a speed of at least 1.5 meters per second. Thereby, the vehicle 1 may move with a higher speed in areas of the warehouse 3 in which no workers are active, whereby the vehicle 1 may reduce its speed in other areas for avoiding collisions. The speed of the vehicle 1 is generally dependent on an actual task being performed by the vehicle 1 and a distance to be completed. While moving, the vehicle 1 determines its actual location within the warehouse 3 by means of an indoor navigation system.

While scanning and/or counting the stock 4, the control device 17 determines a label position on the item respectively on the scanned stock 4 and determines a location of the item in the shelf 4. The scanned label information, the label position and the location of the stock 4 is then stored in the shelf database. If the vehicle 1 scans and/or counts again the stock 4, for example some days after the previous scanning and/or counting, the label position and the location of the item can be easier determined by considering the previously scanned label position and the previously determined location of the item.

Depicted or described connections between components are generally to be understood to be functional connections. They can be implemented as direct links or as indirect links via several other components. The order of presented actions is not mandatory; alternative orders are possible. Actions can be implemented in different ways. They could be implemented in software using program instructions; or they could be implemented in hardware; or they could be implemented making use of a combination of hardware and software. It is to be understood that the described implementations are examples only, which may be modified and/or supplemented in many ways within the scope of the claims. In particular, any feature described for a particular implementation can be used by itself or in combination with other features in any other implementation. Each feature that has been described for an implementation of a particular category can also be used in an equivalent manner in an implementation of any other category.

REFERENCE NUMERALS

Autonomous robot vehicle 1
Scanner 2
Warehouse 3
Stock 4
Shelve 5
Chassis 6
Wheels 7
Floor 8
Autonomous indoor vehicle 9
Tunnel 10
Extendable mast 11
First end, gimbal 12
Second end 13
Image scanner 14
Camera 15
Stripe reader 16
Control device 17
Second extendable mast 18
First end 19
Battery 20
Base station 21
Vibration isolating device 22
LIDAR debris detection sensor 23
Brushes 24
Airblast device 25

The invention claimed is:

1. An autonomous robot vehicle system, comprising:
an autonomous indoor vehicle;
a vehicle chassis for checking and/or counting stock in a warehouse, the vehicle chassis comprising
  an extendable mast with a first end mounted onto the chassis and an opposite second end arrangeable at different distances above the chassis,
  at least one scanner arranged at the second end of the extendable mast and configured for checking and/or counting stock in a shelf of the warehouse lateral to the autonomous robot vehicle system, and
  a second extendable mast arranged perpendicular to the extendable mast, a first end of the second mast mounted to the second end of the extendable mast, the second mast comprising at least one additional scanner configured for checking and/or counting stock underneath the second mast and arrangeable at different distances from the second end of the extendable mast,
wherein the chassis is mounted onto and/or is integrally formed with the autonomous indoor vehicle such that the autonomous indoor vehicle and the chassis are configured for autonomously moving the autonomous robot vehicle system in the warehouse.

2. The autonomous robot vehicle system of claim 1, wherein the mast is extendable between the first end and the second end by a distance of no less than one meter and no greater than fifteen meters, and the mast:
is a telescopic arm and/or a fork lift device; and/or
comprises at least two scanners arrangeable at the mast at different distances above the chassis.

3. The autonomous robot vehicle system of claim 1, further comprising:

a moving gimbal arranged at the first end between the chassis and the mast; and a battery for providing electrical energy to the autonomous robot vehicle system, the battery arranged at the first end of the mast as a counterweight such that the mast is balanced in a vertical direction relative to ground.

4. The autonomous robot vehicle system of claim 1, wherein the scanner comprises one or more of a LIDAR sensor, a barcode reader, an RF scanner, an RFID scanner, a sonar, and a camera.

5. The autonomous robot vehicle system of claim 1, further comprising a control device configured for:
determining if the shelf scanned by the scanner includes the stock;
comparing the scanned shelf with a shelf database; and/or
remembering a position of a scannable label of an item stored on the shelf.

6. The autonomous robot vehicle system of claim 1, further comprising a battery for providing electrical energy to the autonomous robot vehicle system for moving along a predefined and/or self-derived route in the warehouse, the autonomous robot vehicle system configured for autonomously returning to a base station at low battery and/or for continuing a commenced route once the battery has been recharged.

7. The autonomous robot vehicle system of claim 1, further comprising a LIDAR debris detection sensor configured for detecting debris in a moving direction of the autonomous robot vehicle system.

8. The autonomous robot vehicle system of claim 1, further comprising brushes configured for cleaning wheels of the autonomous robot vehicle system.

9. The autonomous robot vehicle system of claim 1, further comprising an airblaster configured for blasting away debris in a moving direction of the autonomous robot vehicle system.

10. The autonomous robot vehicle system of claim 1, further comprising a vibration isolating device arranged at the first end and/or at the second end, the vibration isolating device configured for eliminating movements of the extendable mast.

11. The autonomous robot vehicle system of claim 10, wherein the vibration isolating device comprises a motor working counter-wise to detect distracting movement from wheels of the autonomous robot vehicle system and/or comprises water-balancing.

12. A method for checking and/or counting stock in a warehouse with a vehicle chassis configured for attaching to an autonomous indoor vehicle, an extendable mast is mounted onto the chassis at a first end of the extendable mast, a scanner is arranged at a second, opposite end of the mast, and a second extendable mast is arranged perpendicular to the extendable mast, a first end of the second mast is mounted to the second end of the extendable mast, the second mast comprising at least one additional scanner configured for checking and/or counting stock underneath the second mast and arrangeable at different distances from the second end of the extendable mast, the method comprising:
autonomously moving the vehicle chassis with the autonomous indoor vehicle in the warehouse; and
checking and/or counting stock on a shelf of the warehouse lateral to an autonomous robot vehicle system at different distances above the chassis with the scanner.

13. The method of claim 12, further comprising:
comparing a checked and/or counted result provided by the scanner with data stored in a shelf database to determine a difference; and
when a difference is determined, scanning a label of an item stored on the shelf and/or capturing a photo of the item and updating the shelf database with the scanned label and/or the captured photo; and/or
when no difference is determined, scanning the label of the item stored in the shelf and/or capturing the photo of the item and comparing the scanned label and/or the captured photo with data stored in the shelf database.

14. The method of claim 12, further comprising:
determining a volume of the stock on the shelf;
based on the determined volume, calculating a number of items, pallets, and/or cartons stored on the shelf; and/or
determining a type of an item stored on the shelf by scanning a label of the item and comparing the scanned label with a shelf database.

15. The method of claim 12, further comprising:
moving the autonomous robot vehicle system for checking and/or counting the stock on the shelf at a speed no less than one meter per second; and/or
determining an actual location of the autonomous robot vehicle system within the warehouse while checking and/or counting the stock on the shelf.

16. The method of claim 12, further comprising:
checking and/or counting the stock underneath the second mast at different distances from the second end of the extendable mast with the additional scanner.

17. The method of claim 12, further comprising:
scanning a label of an item stored on the shelf;
determining a label position on the item and/or determining a location of the item on the shelf and/or in the warehouse; and
storing scanned label information, the label position, and/or the location on a shelf database.

18. The method of claim 17, further comprising rescanning the label, redetermining the label position, and/or redetermining the location of the item by considering the previously scanned label position and/or the location of the item.

* * * * *